United States Patent [19]

Dunn

[11] Patent Number: 4,610,562
[45] Date of Patent: Sep. 9, 1986

[54] PERIMETER CLIP

[75] Inventor: James J. Dunn, Carpentersville, Ill.

[73] Assignee: Chicago Metallic Corporation, Chicago, Ill.

[21] Appl. No.: 770,742

[22] Filed: Aug. 29, 1985

[51] Int. Cl.[4] ............................. B25G 3/00; F16B 7/08
[52] U.S. Cl. .................................... 403/233; 403/191; 52/665
[58] Field of Search ............... 403/235, 233, 346, 191; 52/715, 712, 665

[56] References Cited

U.S. PATENT DOCUMENTS 4,479,341 10/1984 Schuplin .................. 52/665

FOREIGN PATENT DOCUMENTS 2119827 11/1983 United Kingdom .................. 52/665

Primary Examiner—Andrew V. Kundrat
Attorney, Agent, or Firm—Hill, Van Santen, Steadman & Simpson

[57] ABSTRACT

A clip for securing or holding a frame member to a perimeter member of a suspended ceiling system characterized by a one-piece member having a flap for engaging a back side of the perimeter member, and a transverse portion for connecting an engaging flange to the flap. The engaging portion includes opposed tabs bent angularly inward toward the flap and which tabs are placed on either side of the frame member so that the frame member is secured to the perimeter member.

10 Claims, 6 Drawing Figures

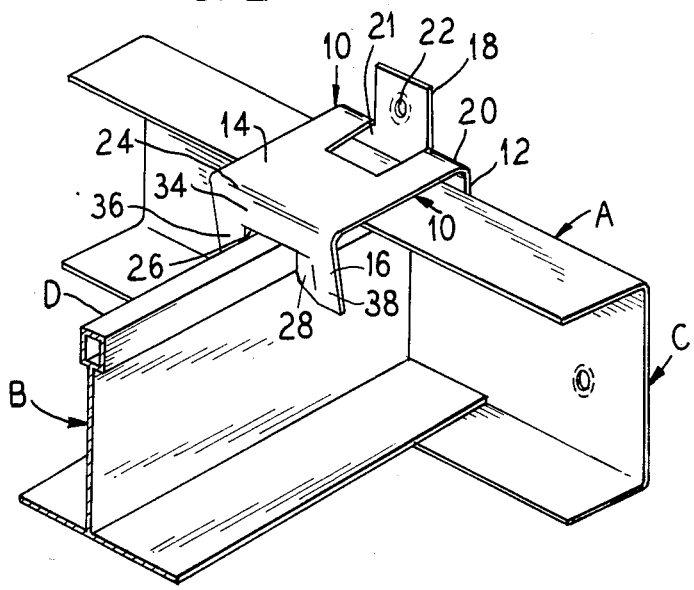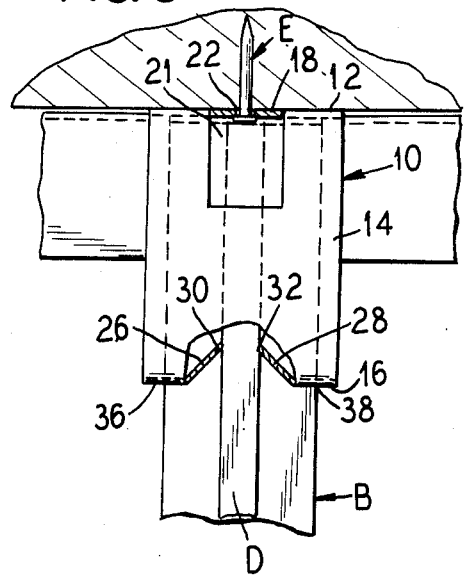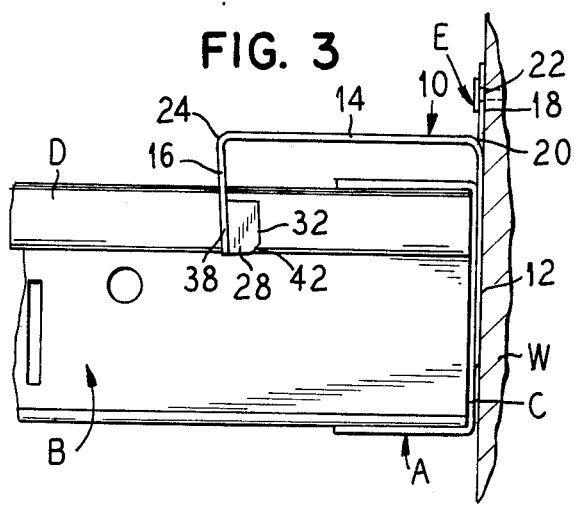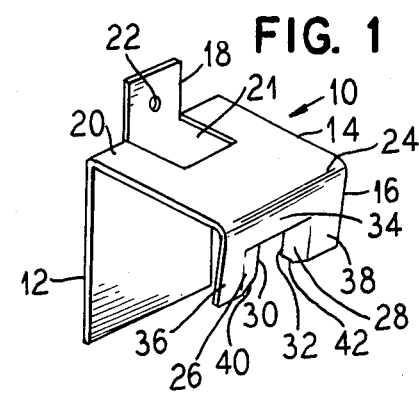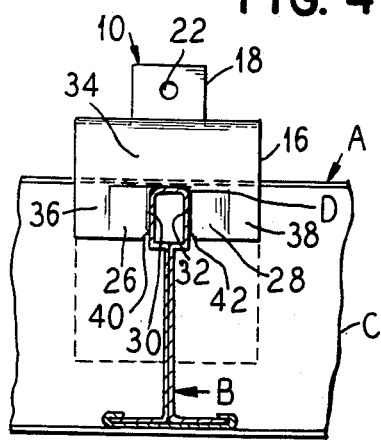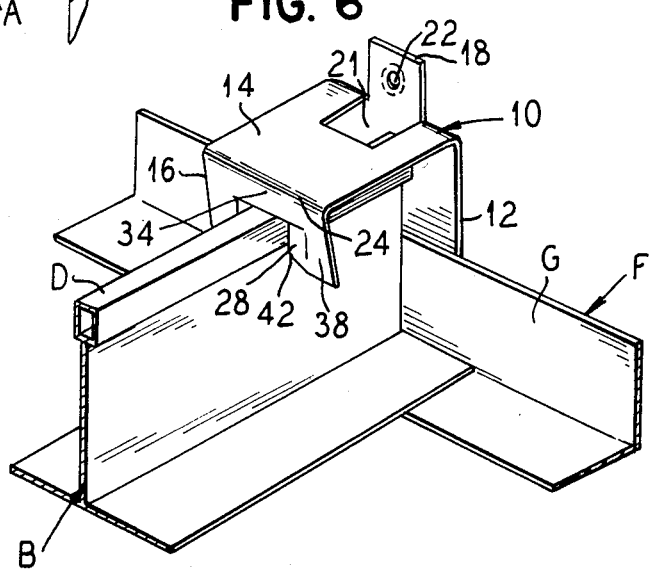

PERIMETER CLIP

BACKGROUND OF THE INVENTION

The present invention relates generally to a clip for securing an extended member to an abutting member, and more particularly, to a perimeter clip for securing a frame member to a perimeter member in a suspended ceiling system.

Panels of a suspended ceiling are held in place by a frame of interconnecting frame members secured to one another. The frame members include perimeter members at the perimeter of the suspended ceiling, such as where the suspended ceiling meets a wall. It is known in the art to secure the frame members to the perimeter members by securing means, such as rivets. The use of rivets requires that flat portions of the frame and perimeter members have holes formed therein and then the rivet is secured in the aligned holes. Riveting the member requires accurate placement of the holes and restricts the possible combinations of frame members, particularly decorative frame members in which portions for readily receiving rivets are not available.

The securing of the rivets in the frame members requires special tools and, once the rivets are in place, it becomes quite difficult to remove them for adjustment of the suspended ceiling grid.

Furthermore any relative motion between the ceiling grid components would tend to loosen the rivet connections between the components, possibly resulting in failure at the interconnecting points.

It would thus be desirable to provide means for connecting ceiling grid components to one another, particularly frame members to perimeter members, where the frames include decorative features. It would also be desirable to provide means for securing the ceiling grid components to one another that would be easy to install and could be removed, if so desired. It would also be desirable to provide means for securing ceiling grid components to one another which does not tend to loosen under relative movement of the grid components.

SUMMARY OF THE INVENTION

It is an object of the present invention to provide a simple, one-piece member or clip for securing ceiling grid components to a perimeter member which clip does not require special tools.

It is another object of the present invention to provide a securing clip for suspended ceiling grid components which may be readily installed and removed.

It is a further object of the present invention to provide a perimeter clip for securing a frame member to a perimeter member of a suspended ceiling grid which tightens under relative motion of the grid components.

These and other objects of the present invention are embodied in a perimeter clip having a flap, a transverse portion extending from the flap, a gripping portion with spaced opposed gripping surfaces for gripping opposed sides of an abutting frames member, and a securing lug for securing the perimeter clip in place. More specifically, the clip is a one-piece member of simple construction having an overall U-shape wherein one leg of the U is formed by the flap, the base of the U is formed by the transverse member and the second leg of the U is formed by the gripping portion. While the perimeter clip may be formed by a plurality of pieces, the one piece member, which can be cut and bent by dies, is preferred. In a preferred embodiment, the flap is joined to the transverse member at a right angle and the gripping portion is joined to the transverse portion at an acute angle, preferably 80°. A securing lug extends from the flap portion substantially in the same plane and adjacent the transverse portion and, in a preferred embodiment, the securing lug has a hole extending therethrough. The gripping portion of a preferred embodiment includes a pair of spaced opposed tab members which are angled inwardly toward the flap.

A frame member of a suspended ceiling grid generally has an inverted T cross-sectional outline with oppositely facing flanges and may have a bead opposite the flanges for added strength. A perimeter member for use in a suspended ceiling grid may either be an angle member having an L-shaped cross-section, or a channel member having a U-shaped cross-section. In the construction of a suspended ceiling, the end of the frame members are abutted against the perimeter member, such as at a wall. The perimeter clip of the present invention secures the frame member to the perimeter member by the location of the gripping tabs of the engaging portion on either side of the bead of the frame member, while at the same time locating the flap behind an opposing position of the perimeter member. Once in place, the perimeter clip may be secured to the wall by a fastening member, such as by driving a nail or spike through the hole in the securing lug.

The perimeter clip secures the frame member to the perimeter member and restricts relative movement therebetween. Movement of the frame member away from the perimeter member causes the inwardly angled gripping tabs to dig deeper into the bead of the frame member and the acute angle of the engaging portion flange prevents outward movement of the frame member with respect to the perimeter member. Movement of the frame member toward the perimeter member, however, is accommodated by the perimeter clip which enables an installer of a suspended ceiling grid to tighten the connections between the two members once the clip is in place, a feature not present in the prior art.

Thus, the present perimeter clip provides a simple, effective device for assembling suspended ceiling grids.

BRIEF DESCRIPTION OF THE DRAWINGS

FIG. 1 is a perspective view of a perimeter clip constructed according to the principles of the present invention.

FIG. 2 is a perspective view of the perimeter clip of FIG. 1 shown in use on suspended ceiling grid components.

FIG. 3 is a side elevational view taken generally from the right with respect to FIG. 2.

FIG. 4 is an end elevational view taken generally from the left with respect to FIG. 2.

FIG. 5 is a top plan view with a portion broken away of the device shown in FIG. 2.

FIG. 6 is a perspective view of the clip of the present invention shown in an alternate application.

DESCRIPTION OF THE PREFERRED EMBODIMENT

The principles of the present invention are particularly useful in a perimeter clip generally indicated at 10 in FIG. 1. The clip 10 has a flap 12, a transverse portion 14, a gripping flange 16, and a securing lug 18. The flap 12 consists of a flattened web to which the transverse portion 14 is joined at a first bend or edge 20. The transverse portion 14 extends from the flap 12 generally at a right angle and in the preferred embodiment, is formed simply by bending a single sheet of material. The securing lug 18 also extends from the first edge 20 of the flap 12 substantially in the plane of the flap and, in the preferred embodiment shown in FIG. 1, it is formed by punching a portion or tab from the transverse portion 14, which leaves an opening 21 in the transverse portion 14. The securing lug 18 may also be punched from the flap 12, leaving an opening therein (not shown). The securing lug 18 includes a hole 22 extending therethrough. The hole 22 may be centrally located in the lug 18 or it may be to one side of the lug 18, so that the lug 18 forms a hook shaped member (not shown).

The engaging flange 16 joins the transverse portion 14 at a second bend or edge 24, which edge 24 is opposite the first edge 20. The engaging flange 16, in a preferred embodiment, extends from the transverse portion 14 at an acute angle so that it bends inwardly with respect to the flap 12. The engaging flange 16 includes first and second opposed gripping tabs 26 and 28 formed therein. The gripping tabs 26 and 28 include inwardly facing gripping edges 30 and 32, respectively, on the respective proximate ends. In the preferred embodiment, the gripping tabs 26 and 28 are bent inwardly toward the flap 12 so that the gripping tabs 26 and 28, which form a slot for receiving a frame member, resist outward movement of the engaged frame member. The tabs 26 and 28 are spaced from the bend 24 by a portion 34 that extends from the bend 24 to the edges of the tabs 26 and 28. Support portions 36 and 38 extend from the portion 34 and provide support for the tabs 26 and 28, respectively. The lower corners 40 and 42 of the gripping edges 30 and 32 are angled to more easily receive the frame members. The tabs 26 and 28 are spaced apart to receive the frame member. Various sizes of frame members may be accommodated by the removal of varying widths of material from between the gripping tabs 26 and 28. For simplicity and strength, the perimeter clip 10 of the present invention may be formed of a single piece of sheet metal by a die forming operation which cuts the clip from a sheet and bends the clip.

FIG. 2 shows a perimeter clip in place securing a perimeter member A to a frame member B in a suspended ceiling grid. The frame member B is abutted against the perimeter member A and the clip 10 is forced downwardly thereover so that the flap 12 extends behind a base portion C of the perimeter member A and between the member A and a surface of a wall W (see FIG. 3) and so that the gripping tabs 26 and 28 extend on either side of a bead D of the frame member B. The transverse portion 14 spans a side E of the channel-shaped perimeter member A so that the flap 12 may be placed behind the base C and still enable the engaging flange 16 to grip the frame B. The base C is taller than the frame member B and the portion 34 compensates for the difference to ensure proper alignment of the clip 10. The bead portion D of the frame member B may be of various widths and the tabs 26 and 28, in various clip embodiments, are spaced to accommodate the different bead widths.

As can be seen by examining FIGS. 3 through 5, the gripping edges 30 and 32 clamp tightly on either side of the bead D of the frame member B so that the frame member B may not be pulled endwardly away from the perimeter member A. The top plan view of FIG. 5 shows the inwardly angled gripping tabs 26 and 28 which tabs may form an angle of approximately 45° with the plane of the flange 16. Any movement of the frame member B away from the perimeter member A causes the gripping edges 30 and 32 to grip more tightly on the bead D, increasing the gripping of the perimeter clip 10. The acute angle between the transverse portion 14 and the engaging flange 16 also aids the gripping tabs 26 and 28 in securing the frame member B to the perimeter member A.

Endward movement of the frame B toward the perimeter member A enables the bead D to slide between the gripping tabs 26 and 28 somewhat, which enables the perimeter clip 10 to secure the two ceiling grid components even in more tightly together.

The securing lug 18, extending upwardly from the flap 12, provides an easy means for securing the clip 10 to the wall W such as by driving a nail or spike E therethrough. Thus, lateral movement of the frame member B along the length of the perimeter member A is prevented.

FIG. 6 shows the perimeter clip 10 in use on a ceiling grid including a different type of perimeter member than that shown in FIGS. 2 through 5. The perimeter member F of FIG. 6 is an angle iron member having an L-shaped cross-section wherein the flap 12 engages the base portion G of the perimeter member F so that the frame member B and the perimeter member F are secured to one another in substantially the same manner as described above.

Thus it can be seen from the above description that the perimeter clip 10 can secure ceiling grid components to one another in a single step without special tools. Decorative frame members and perimeter members, such as those which do not have flat surfaces through which a rivet could be secured, can still be connected by the present perimeter clip 10. Although the frame members B shown and described in the present application include a widened bead portion D at the top thereof which is engaged by the gripping tabs 26 and 28, the present perimeter clip 10 may also be adopted for use with frame members which do not include a widened bead, in which case the gripping tabs 26 and 28 would be spaced closer together.

The present perimeter clip is strong, simple, and inexpensive. It effectively connects grid components of suspended ceiling to one another without the necessity of forming holes. Once assembled with the present clip, the ceiling grid can be adjusted or even disassembled and reassembled without damaging the grid components and without leaving unsightly holes from misplaced connections. The present clip includes means for securing the cross frame members to a wall, thereby providing added support for the ceiling grid.

It is apparent from the foregoing specification, that the invention is susceptible to being embodied with various alterations and modifications which may differ particularly from those that I have described in the preceding specification and description. It should be understood that I wish to embody within the scope of the patent granted hereon all such modifications as reasonably and properly come within the scope of my contribution to the art.

I claim:

1. A clip for securing an elongated frame member of a suspended ceiling to a perimeter member having a flat surface extending substantially perpendicular to the elongated frame member, said clip comprising a flat flap for placement against the flat surface of the perimeter member, a linking web portion having one end connected to one edge of the flap and a second end spaced from the one end and means for gripping the elongated frame member attached to the second end and including a flange extending at an angle to said web portion with the flap, web portion and flange forming a substantially U-shaped member, said flange having a pair of tabs bent on fold lines out of the plane of the flange to form a slot extending substantially at right angles to the second end of the web portion and the tabs having gripping edges facing each other and facing the flap, said pair of gripping edges gripping opposite surfaces of the elongated frame member inserted into the slot between the tabs and coacting to prevent movement of the frame member away from the perimeter member and flap of the clip.

2. A clip according to claim 1, wherein said flap has means for securing said clip to a surface.

3. A clip according to claim 2, wherein said means for securing includes a lug extending from said flap and having a hole therethrough for receiving a fastening element.

4. A clip according to claim 1, wherein the U-shaped member formed by the flap, means for gripping and web portion is a one-piece member.

5. A clip according to claim 4, wherein the angle between the flange and the linking web portion is approximately 80° so that each of the gripping edges extends at an angle of 80° to the plane of the web portion to cause the gripping edges to dig into an elongated frame member being pulled away from the perimeter member.

6. A clip according to claim 4, wherein the flap has a lug with a hole extending above the web portion to enable securing the clip to a wall member.

7. A clip having a U shape for securing an elongated member having an end in abutting relationship with a second member having a flat surface extending at right angles to the elongated member, said clip comprising a one-piece member having a web portion connected by a bend at one end to a flat flap portion engaging the flat surface of the abutting member, said web portion at the opposite end being connected by a second bend to a flange extending at an angle thereto, said flange having a cut line extending parallel to the second bend and a pair of spaced-apart fold lines extending perpendicular to the cut line, material between the fold lines being bent on the fold lines out of the plane of the flange toward said flap to form tabs, said tabs having gripping edges facing the flap and facing each other for engaging opposite sides of the elongated member inserted in the space between the tabs to hold the elongated member with its end abutting the abutment member.

8. A clip according to claim 7, wherein the angle between the flange and web portion is approximately 80° so that the gripping edges extend at an angle of approximately 80° to the web portion.

9. A clip according to claim 7, wherein the abutment member is adapted to be secured to a wall with the flat surface engaging the wall surface, said flat being inserted between the wall and said flat surface and said flap having means for securing the clip to said wall.

10. A clip according to claim 9, wherein said means for securing includes a tab having a hole for receiving a fastener.

* * * * *